United States Patent
Kowalski et al.

(10) Patent No.: US 6,554,696 B2
(45) Date of Patent: Apr. 29, 2003

(54) AIR DUCT OUTLETS WITH CLOSEABLE DOORS AND VEHICLES INCORPORATING SAME

(75) Inventors: Edward L. Kowalski, Rochester Hills, MI (US); Thomas F. J. Gehring, Ontario (CA); Ireneusz Jankowski, Ontario (CA); Dejan Havidic, Toronto (CA); Sayeh D. Beheshti, Ontario (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/894,149

(22) Filed: Jun. 28, 2001

(65) Prior Publication Data

US 2002/0072321 A1 Jun. 13, 2002

Related U.S. Application Data

(60) Provisional application No. 60/215,007, filed on Jun. 29, 2000.

(51) Int. Cl.[7] .................................................. B60H 1/34
(52) U.S. Cl. ........................................ 454/155; 454/195
(58) Field of Search ................................ 454/155, 152, 454/154, 195

(56) References Cited

U.S. PATENT DOCUMENTS

| | | | |
|---|---|---|---|
| 1,751,441 A | | 3/1930 | Campbell |
| 4,137,671 A | | 2/1979 | Miller |
| 4,252,053 A | | 2/1981 | Muto et al. |
| 4,800,951 A | * | 1/1989 | Sakurai ..................... 165/203 |
| 5,010,742 A | * | 4/1991 | Bolton et al. ................ 62/262 |
| 5,188,561 A | | 2/1993 | Nissimoff et al. |
| 5,338,252 A | | 8/1994 | Bowler et al. |
| 5,467,606 A | * | 11/1995 | Sasaki et al. ................ 165/127 |
| 5,622,395 A | * | 4/1997 | Shine et al. ................. 292/125 |
| 5,690,550 A | | 11/1997 | Mikowski |
| 5,741,179 A | | 4/1998 | Sun et al. |
| 5,752,877 A | | 5/1998 | Sun |
| 5,782,688 A | | 7/1998 | Baek et al. |
| 5,868,617 A | | 2/1999 | Kim |
| 5,878,809 A | | 3/1999 | Heinle |
| 5,947,813 A | | 9/1999 | Chow et al. |
| 6,129,627 A | | 10/2000 | Jankowski et al. |
| 6,146,265 A | * | 11/2000 | Greenwald ................... 251/901 |
| 6,171,183 B1 | * | 1/2001 | Villbrandt et al. ........... 251/294 |
| 6,189,799 B1 | * | 2/2001 | Parker et al. ................. 236/51 |
| 6,209,404 B1 | | 4/2001 | Le |
| 6,224,480 B1 | | 5/2001 | Le et al. |
| 6,386,965 B1 | * | 5/2002 | Greenwald et al. ........... 165/41 |
| 6,394,891 B1 | * | 5/2002 | Arold .......................... 454/155 |

FOREIGN PATENT DOCUMENTS

| | | |
|---|---|---|
| DE | 39 08 612 A1 | 9/1990 |
| DE | 196 15 223 A1 | 10/1998 |
| EP | 0 289 065 B1 | 2/1988 |
| EP | 0 412 063 A1 | 2/1991 |
| JP | 5911410 | 7/1984 |

OTHER PUBLICATIONS

Copy of International Search Report for PCT/US01/41225.

* cited by examiner

*Primary Examiner*—Harold Joyce
*Assistant Examiner*—Derek Boles
(74) *Attorney, Agent, or Firm*—Myers Bigel Sibley & Sajovec

(57) ABSTRACT

Air duct outlets having closeable doors are provided. An air duct outlet includes a housing having a front wall with an opening therein that allows air to pass therethrough. A door assembly is movably mounted to the housing and includes a unitary door having an exterior surface. The door assembly is movable between a closed position and an open position. The door substantially covers the front wall opening and is substantially flush with the front wall when the door assembly is in the closed position. The door is retracted from the front wall opening when the door assembly is in the open position. In the closed position, the door provides a continuous, uniform, and aesthetically pleasing appearance with the front wall.

28 Claims, 6 Drawing Sheets

AIR DUCT OUTLETS WITH CLOSEABLE DOORS AND VEHICLES INCORPORATING SAME

RELATED APPLICATIONS

This application claims the benefit of U.S. Provisional Application No. 60/215,007, filed Jun. 29, 2000, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, a vehicle interior is provided with one or more air duct outlets which are connected by ducts to a heating and air conditioning system that provides cooled or heated air to the interior of the vehicle. Because it is generally desirable for vehicle occupants to be able to adjust the direction of air flow within a vehicle interior, these outlets are typically provided with adjustable louvers. In addition, these outlets may be provided with dampers for allowing vehicle occupants to control the amount of air flowing therethrough.

Unfortunately, air flow from an outlet may not be entirely stopped via conventional adjustable louvers and dampers. In addition, it may be desirable to hide air duct outlets from view when not in use.

SUMMARY OF THE INVENTION

In view of the above discussion, air duct outlets having closeable doors are provided. According to embodiments of the present invention, an air duct outlet includes a housing having a front wall with an opening therein that allows air flowing from an air duct to pass therethrough. A door assembly is movably mounted to the housing and includes a unitary door having an exterior surface. The door assembly is movable between a closed position and an open position. The door is configured to substantially cover the front wall opening and to be substantially flush with the front wall when the door assembly is in the closed position. The door is retracted from the front wall opening when the door assembly is in the open position and air is allowed to pass through the door assembly and into a vehicle compartment. In the closed position, the door provides a continuous, uniform, and aesthetically pleasing appearance with the front wall.

According to embodiments of the present invention, the door exterior surface may have an appearance that is substantially similar to an appearance of the exterior surface of the surrounding front wall, as well as the exterior surface of a surrounding interior trim panel within which the air duct outlet is mounted (e.g., a vehicle dashboard, instrument panel, etc.).

According to embodiments of the present invention, a door assembly includes a pair of side panels that extend outwardly from the door in adjacent, spaced-apart relationship. The side panels are pivotally attached within the housing and facilitate movement of the door assembly between the closed position and open position. A control assembly is connected between the housing and at least one of the side panels and is configured to urge the door assembly to the open position.

A latch assembly is connected to the housing and is configured to releasably secure the door assembly in the closed position and to release the door assembly when a force is applied to the door such that the door assembly can be urged to the open position. The latch assembly releases the door assembly when a force is applied to the exterior surface of the door by a user. The latch assembly releasably secures the door assembly when a user manually pulls the door down over the front wall opening.

According to embodiments of the present invention, a push-pull latch assembly that is reciprocatingly operable between a first position and a second position may be utilized. According to alternative embodiments, a push—push latch assembly that is reciprocatingly operable between a first position and a second position may be utilized.

According to additional embodiments of the present invention, an air duct outlet may include an occupant sensing device that is configured to sense the presence of a person within a predetermined proximity of the air duct outlet. According to embodiments of the present invention, the occupant sensing device may communicate with the latch assembly such that the door assembly is moved automatically from a closed position to an open position if an occupant is within a certain proximity of the air duct outlet.

According to additional embodiments of the present invention, an air duct outlet includes a housing having a passageway extending therethrough, a set of louvers movably mounted within the housing passageway, and a door assembly movably mounted to the housing and movable between a closed position and an open position. The set of louvers are movable between a retracted position within the housing and an extended position extending outwardly from the housing. The door assembly substantially covers the passageway when in the closed position and is retracted from the passageway when in the open position. The door assembly is operably associated with the set of louvers such that when the door assembly is moved to the open position the set of louvers are moved to the extended position, and such that when the door assembly is moved to the closed position the set of louvers are moved to the retracted position.

Air duct outlet doors according to embodiments of the present invention are configured for convenient use by vehicle occupants. Air duct outlet doors according to embodiments of the present invention are also configured to be relatively inconspicuous when not in use, yet blend in with a dashboard or other interior trim panel of a vehicle when in use.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
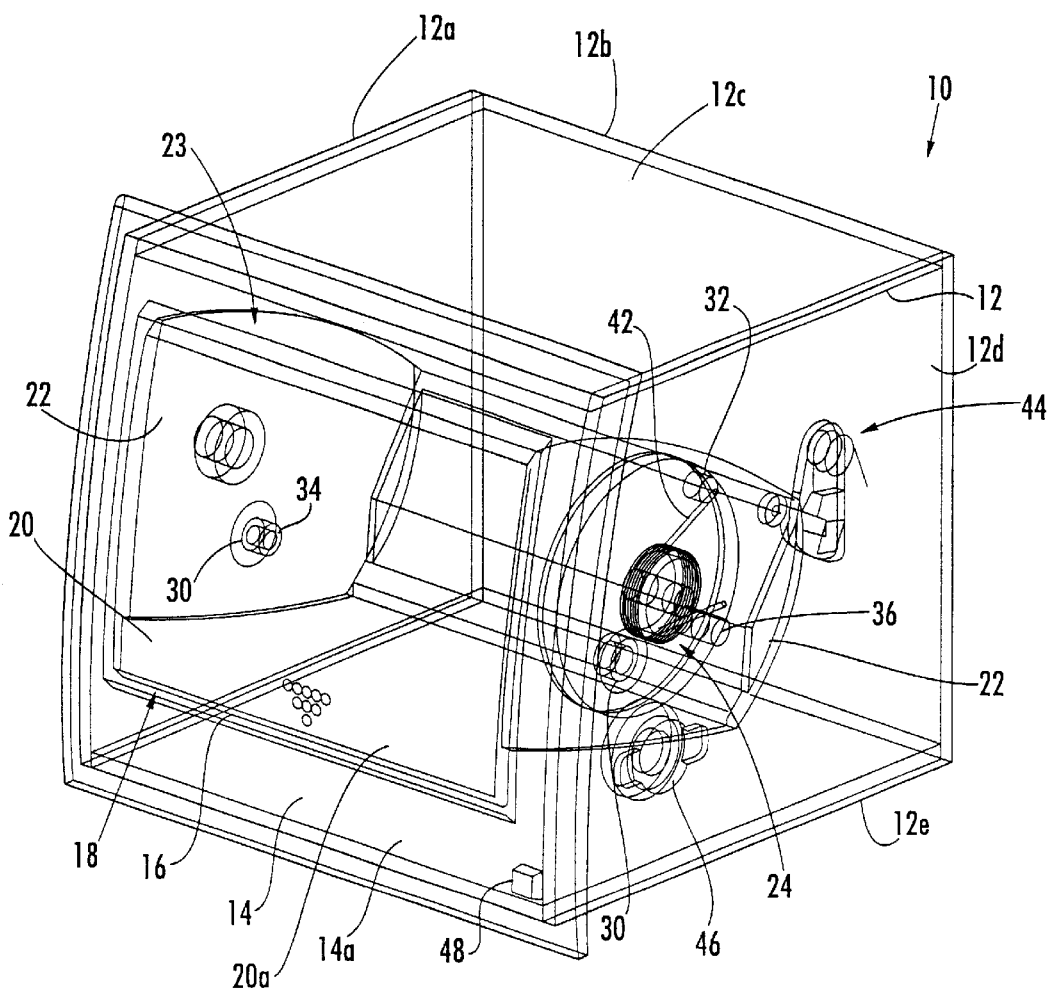
FIG. 1 is a perspective, partially cut-away view of an air duct outlet, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 2:
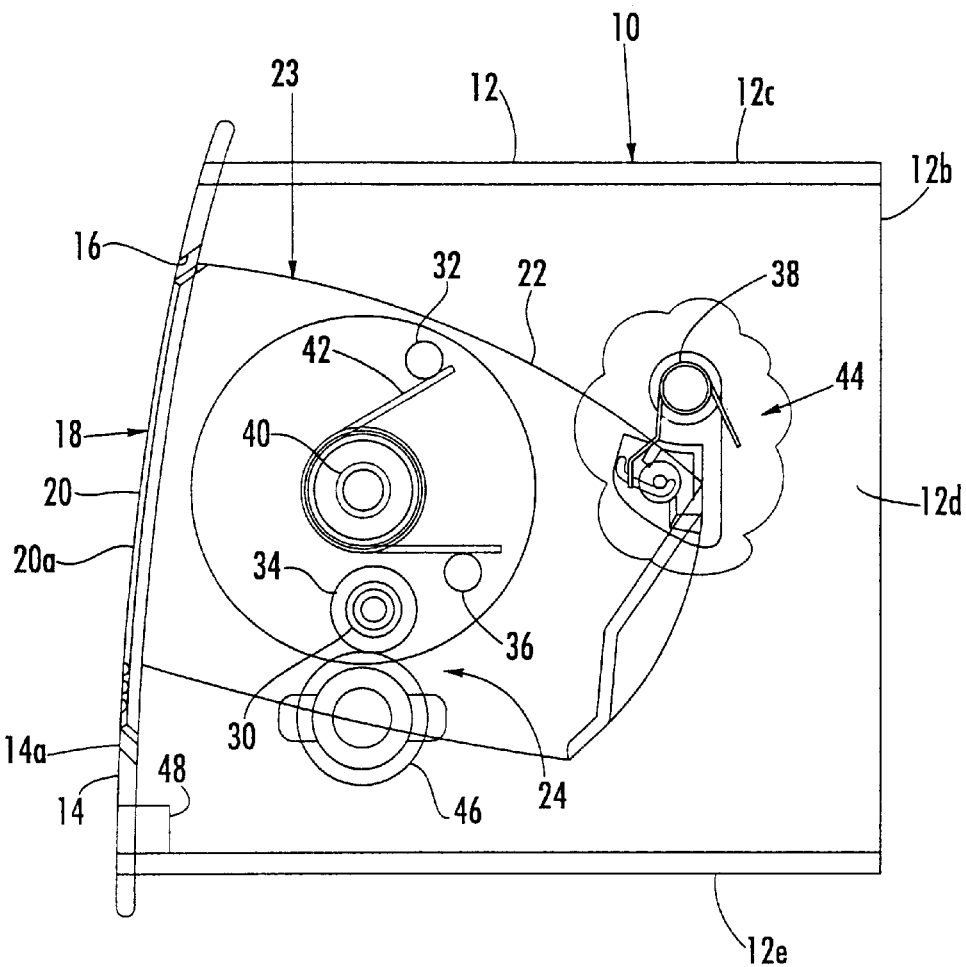
FIG. 2 is a side view of the air duct outlet of FIG. 1.

Referring to FIGS. 1–2, an air duct outlet 10 having a closeable door, according to embodiments of the present invention, is illustrated. The illustrated air duct outlet 10 is designed for use within the interior compartments of vehicles, such as automobiles, trucks, and the like. However, it is understood that air duct outlets according to embodiments of the present invention may be utilized in various environments and are not limited to use in vehicles.

The illustrated air duct outlet 10 includes a housing 12 that has a front wall 14 having an opening 16 therein that allows air to pass therethrough. As would be understood by those skilled in the art, the air duct outlet 10 is connected to a source of air flow, such as from a fan, to supply heated and/or cooled air to an interior compartment of a vehicle. Air may be supplied into the housing 12 through any of the internal walls (12a–12e) of the housing 12 and selectively exits through the opening 16.

The illustrated air duct outlet 10 includes a door assembly 18 that is movably mounted to the housing 12. The door assembly 18 includes a unitary door 20 having an exterior surface 20a. The door assembly 18 is movable between a closed position and an open position. The door 20 substantially covers the front wall opening 16 and is substantially flush with the front wall 14 when the door assembly 18 is in the closed position. The door 20 is retracted from the front wall opening 16 and maintained in an inconspicuous, out-of-the-way position when the door assembly 18 is in the open position. Air is allowed to flow through passageway 23 in the door assembly and into a vehicle compartment when the door assembly 18 is in the open position. Louvers (not shown) may be provided within the passageway 23 to allow for control of air flow direction.

In the closed position, the door 20 provides a continuous and uniform appearance with the front wall 14. According to embodiments of the present invention, the door exterior surface 20a has an appearance that is substantially similar to an appearance of the exterior surface 14a of the front wall 14, as well as the exterior surface of an interior panel within which the air duct outlet 10 is mounted (e.g., a vehicle dashboard, instrument panel, etc.).

The illustrated door assembly 18 also includes a pair of side panels 22 that extend outwardly from the door 20 in adjacent, spaced-apart relationship. The side panels 22 are pivotally attached within the housing 12 to walls 12a, 12d and facilitate movement of the door assembly 18 between the closed position and open position. The side panels 22 also form the passageway 23 through which air flows when the door assembly 18 is in the open position.

In the illustrated embodiment respective trunnions 34 are attached to the housing 12 via respective apertures 30 in housing walls 12a, 12d. The trunnions 34 provide the axis about which the side panels 22 pivot. Trunnions are well understood by those skilled in the art, and need not be described further herein. Moreover, it is understood that the side panels 22 may be movably mounted to the housing 12 in various other ways, without limitation.

The illustrated door assembly 18 further includes a control assembly 24 connected between the housing 12 and one of the side panels 22. The control assembly is configured to urge the door assembly 18 to the open position. In the illustrated embodiment, the control assembly 24 includes spring pins 32, 36 connected to the housing wall 12d and extending into the housing 12. The spring pins 32, 36 are engaged by a torsion spring (e.g., wrapped spring wire, such as piano wire spring) 42 that is configured to bias the door assembly 18 to the open position. The illustrated control assembly 24 further includes a dampener 46 attached to the housing wall 12d that is configured to control how fast the door assembly 18 moves from the closed position to the open position. The dampener 46 frictionally engages a trunnion 34 as illustrated. Dampeners are well understood by those skilled in the art and need not be described further herein.

The illustrated air duct outlet 10 further includes a latch assembly 44 that is connected to the housing 12 and that is configured to releasably secure the door assembly 18 in the closed position and to release the door assembly 18 when a force is applied to the door 20 such that the door assembly can be urged to the open position by the spring 42. The latch assembly 44 engages the latch pin 38 to releasably secure the door assembly 18 in the closed position and releases the latch pin 38 to allow the spring 42 of the control assembly 24 to urge the door assembly 18 to the open position. The latch assembly 44 releases the latch pin 38 when a force is applied to the exterior surface 20a of the door by a user. The latch assembly 44 releasably secures the latch pin 38 when a user manually pulls the door 20 down over the front wall opening 16.

The illustrated latch assembly 44 is a push-pull latch assembly that is reciprocatingly operable between a first position and a second position. The door assembly 18 is in the open position when the push-pull latch assembly 44 is in the first position, and the door assembly 18 is in the closed position when the push-pull latch assembly 44 is in the second position. Push-pull latch assembly devices are well known to those skilled in the art and need not be described further herein. Embodiments of the present invention are not limited to the illustrated latch assembly 44. Various types of latch assemblies that allow a user to move the door assembly 18 between the open and closed positions may be utilized.

According to embodiments of the present invention, the air duct outlet of FIGS. 1–2 also includes an occupant sensing device 48. The occupant sensing device 48 is configured to sense the presence of a person within a predetermined proximity of the air duct outlet 10. According to embodiments of the present invention, the occupant sensing device 48 may communicate with the latch assembly 44 such that the latch assembly 44 releases the door assembly 18 and allows the door assembly 18 to move from a closed position to an open position if an occupant is within a certain proximity of the air duct outlet 10. An exemplary occupant sensing device is an infrared sensor; however, various other sensors may be utilized. When the sensing device 48 determines that an occupant is in proximity of the air duct outlet, the latch assembly 44 can be activated to release the latch pin 38, thereby allowing the door assembly to be urged to the open position.

Figure 3:
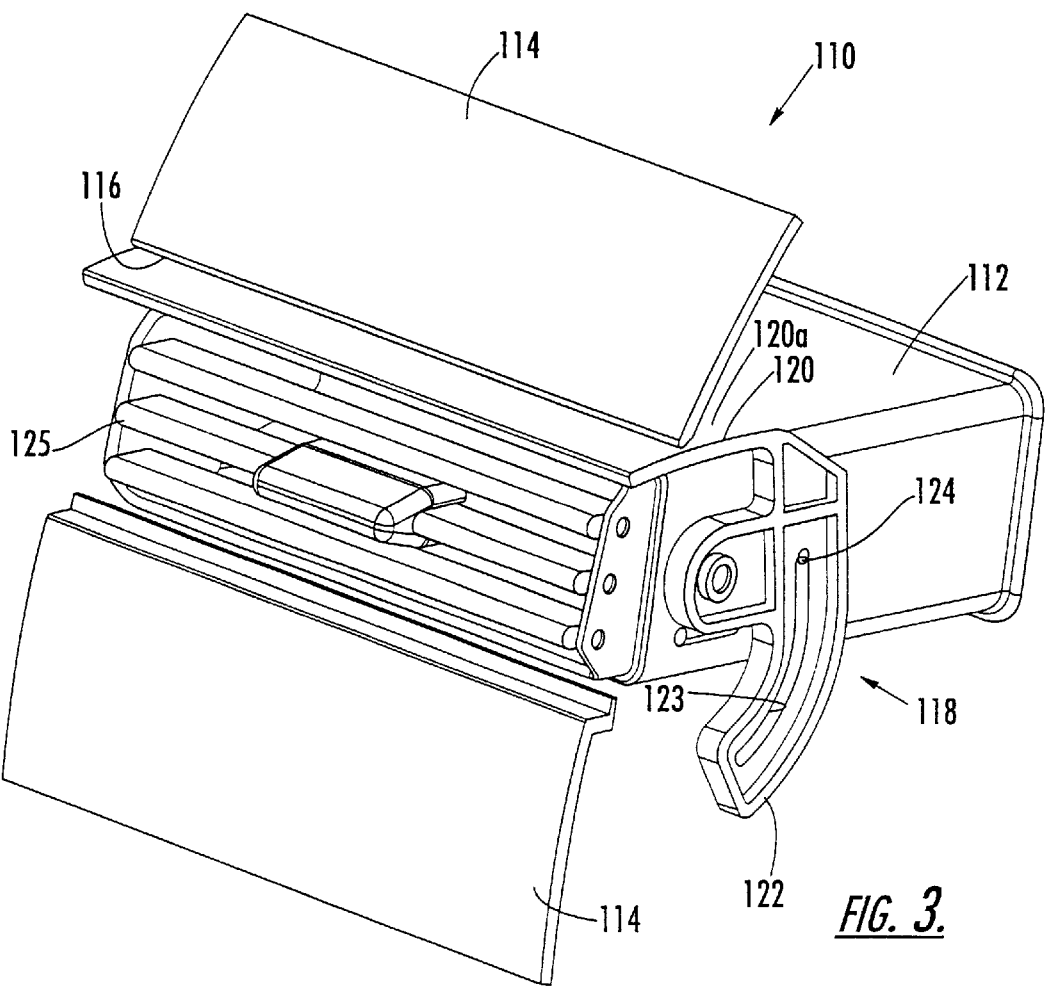
FIG. 3 is a perspective view of an air duct outlet, according to additional embodiments of the present invention.
Figure 4:
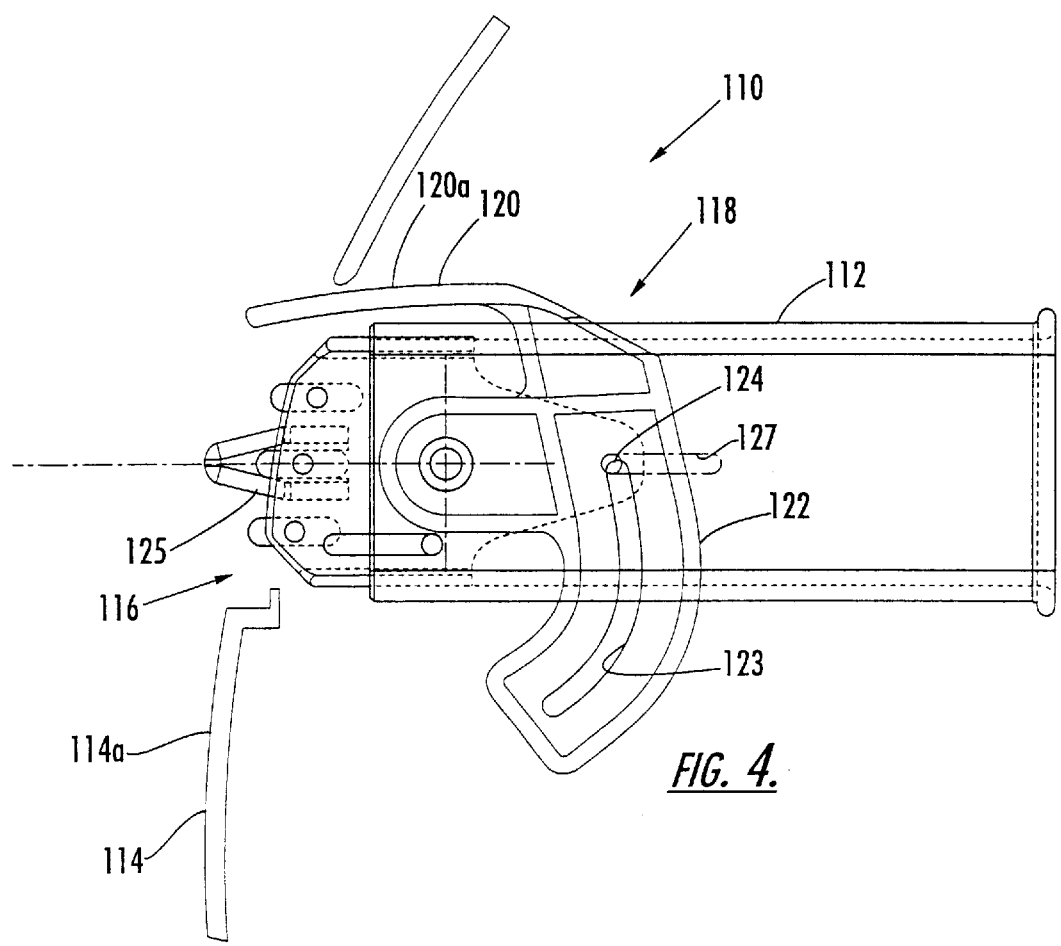
FIG. 4 is a side view of the air duct outlet of FIG. 3 illustrating the door assembly in the open position.
Figure 5:
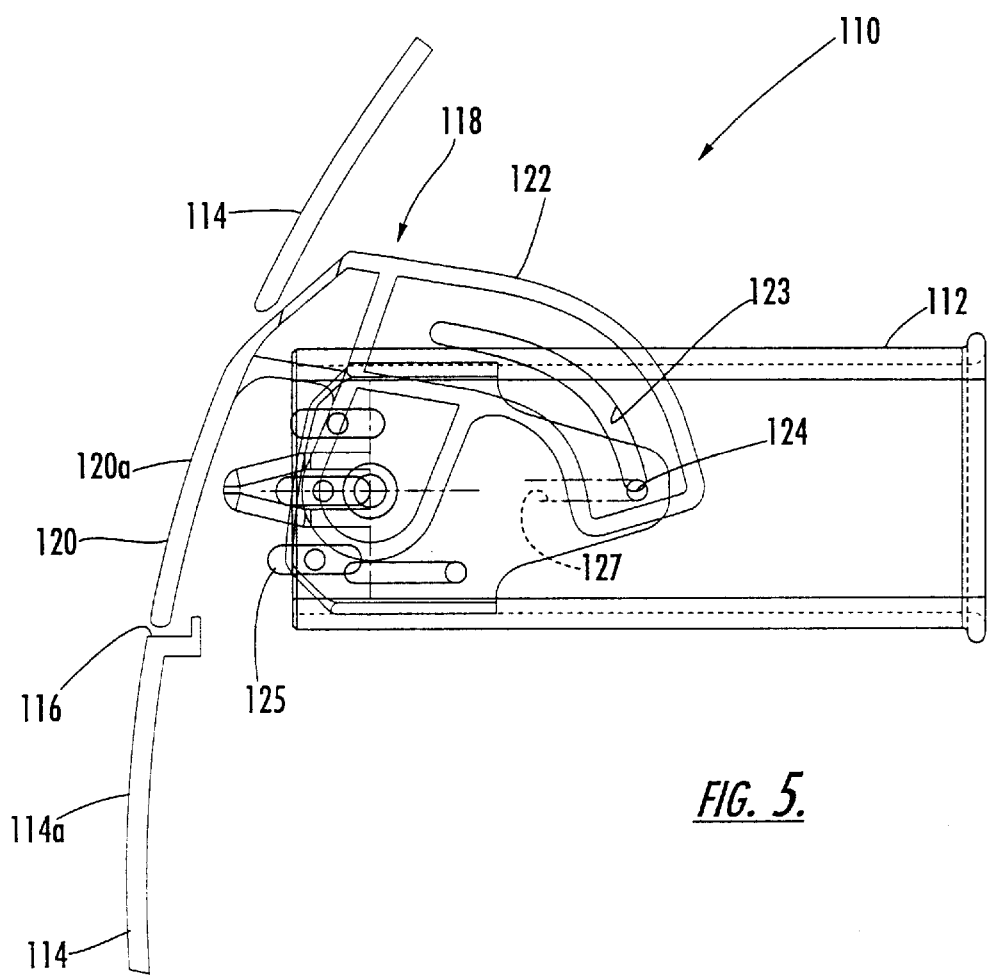
FIG. 5 is a side view of the air duct outlet of FIG. 3 illustrating the door assembly in the closed position.

Referring now to FIGS. 3–5, an air duct outlet 110 having a closeable door operably associated with a movable set of louvers, according to other embodiments of the present invention, is illustrated. The illustrated air duct outlet 110 includes a housing 112 having a passageway extending therethrough that allows air to pass from a duct through the air duct outlet 110 into an interior compartment of a vehicle. In the illustrated embodiment, the air duct outlet 110 is disposed within an opening in an interior trim panel 114 (e.g., a vehicle dashboard, instrument panel, etc.)

A door assembly 118 is movably mounted to the housing 112 and is movable between a closed position (FIG. 9) and an open position (FIGS. 7 and 8). The door assembly 118 includes a door 120 having an exterior surface 120a, and a pair of side panels 122 connected to the door 120 in adjacent, spaced-apart relationship. Each side panel 122 has an arcuate slot 123 formed therein that engages a respective guide pin 124 that is movably associated with the housing 112 and the set of louvers 125. Each guide pin 124 is movable within a respective slot 127 in the housing 112 such that the set of louvers 125 can be extended and retracted as the door assembly 118 is moved between open and closed positions.

Movement of the guide pins 124 causes movement of the side panels 122 along the slots 123 which, in turn, causes movement of the door assembly 118 between the open and closed positions. In the closed position (FIG. 5), the door 120 substantially covers the panel opening 116 and is substantially flush with the panel 114. In the closed position, the door 120 provides a continuous, aesthetically pleasing appearance with the panel 114, and the set of louvers 125 are retracted into the housing 112, as illustrated. In the open position, the door 120 is retracted from the panel opening 116, and the set of louvers 125 extend outwardly from the housing 112, as illustrated in FIG. 4.

According to embodiments of the present invention, the door exterior surface 120a may have an appearance that is substantially similar to an appearance of the exterior surface 114a of the interior compartment panel 114.

The air duct outlet 110 may include a control assembly (not shown) for urging the door assembly 118 to the open position and a latch assembly (not shown) for releasably securing the door assembly 118 in a closed position as described with respect to the embodiments illustrated in FIGS. 1–2. In addition, an occupant sensing device (not shown) may be utilized with embodiments of the air duct outlet 110. The occupant sensing device is configured to sense the presence of a person within a predetermined proximity of the air duct outlet 110 and to communicate with a latch assembly such that the latch assembly releases the door assembly 118 and allows the door assembly 118 to move from a closed position to an open position if an occupant is within a certain proximity of the air duct outlet 110.

According to other embodiments of the present invention, the set of lovers 125 may be fixed within the housing 112, and the door assembly 118 may move between closed and open positions independently of the set of louvers 125.

Figure 6:
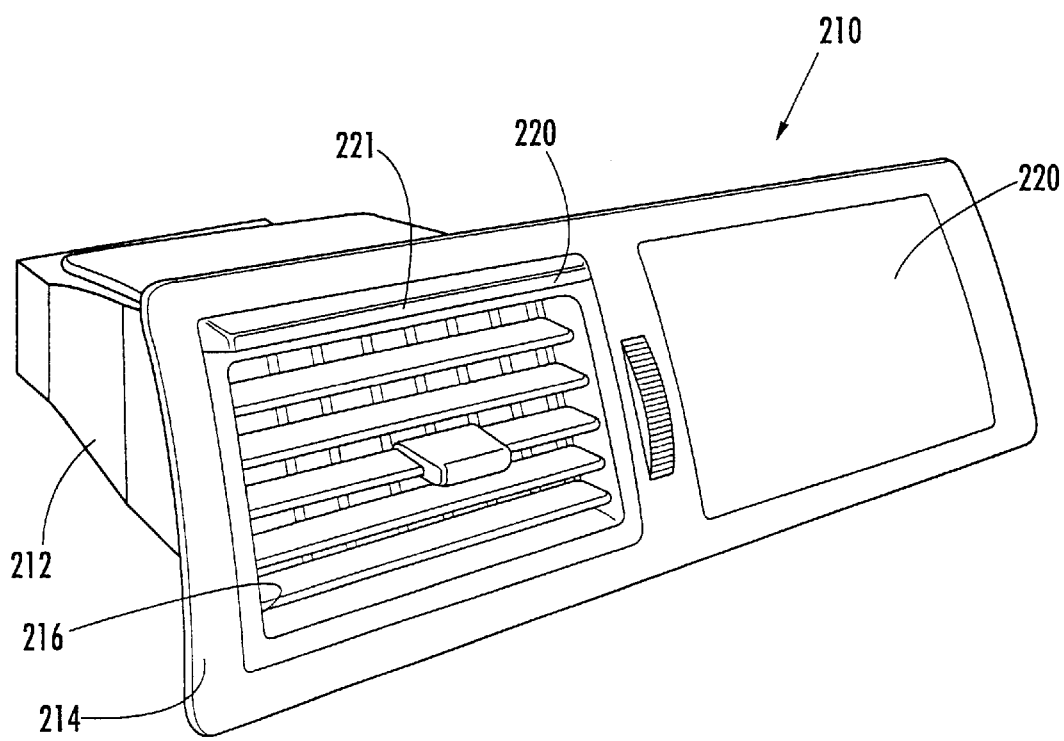
FIG. 6 is a perspective view of an air duct outlet, according to additional embodiments of the present invention.

Referring now to FIG. 6, an air duct outlet 210 having a movable door 220, according to other embodiments of the present invention, is illustrated. The illustrated air duct outlet 210 includes a housing 212 that has a front wall 214 with two openings 216 therein that allows air to pass therethrough. A door assembly 218 as described above with respect to either FIGS. 1–2 or FIGS. 3–5 is movably mounted to the housing 212 and is movable between a closed position wherein the door 220 overlies the opening 216 and an open position wherein the door 220 is retracted from the opening 216. The door 220 on the left is in an open position and the door 220 on the right is in a closed position having a flush configuration with the front wall 214 of the housing 212.

The door assembly 218 includes a push—push latch assembly (not shown) that is reciprocatingly operable between a first position and a second position. Push—push latch assembly devices are well known to those skilled in the art and need not be described further herein. To move the door assembly from an open position to a closed position, a user pushes the exposed edge 221 of the retracted door 220 that extends slightly from the front wall opening 216. The push—push latch assembly is configured to release the door assembly and allow the door assembly to be urged to the closed position. To return the door assembly to the open position, a user manually moves (pushes) the door 220 to a retracted position and the latch assembly releasably secures the door in the open position.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An air duct outlet, comprising:
    a housing comprising a front wall having an opening therein that allows air to pass therethrough;
    a door assembly movably mounted to the housing, wherein the door assembly comprises a door having an exterior surface, a spring that is configured to urge the door assembly to the open position, wherein the door assembly is movable between a closed position and an open position, wherein the door substantially covers the front wall opening and is substantially flush with the front wall when the door assembly is in the closed position, and wherein the door is retracted from the front wall opening when the door assembly is in the open position such that air can pass through the front wall opening;
    a latch assembly connected to the housing that is reciprocatingly operable between a first position and a second position, wherein the door assembly is in the open position when the latch assembly is in the first position, and wherein the door assembly is in the closed position when the latch assembly is in the second position; and
    a sensor attached to the front wall that is configured to sense the presence of a person within a predetermined proximity of the air duct outlet, and to cause the latch assembly to release the door assembly if closed.

2. The air duct outlet of claim 1, wherein the door assembly further comprises a pair of side panels extending outwardly from the door in adjacent, spaced-apart relationship that define a passageway through which air can pass when the door assembly is in the open position, and wherein the side panels are pivotally attached to the housing.

3. The air duct outlet of claim 1, further comprising a dampener attached to the housing and configured to control how fast the door assembly moves from the closed position to the open position.

4. The air duct outlet of claim 1, wherein the door exterior surface has an appearance that is substantially similar to an appearance of an exterior surface of the front wall.

5. The air duct outlet of claim 1, wherein the door assembly further comprises a spring that is configured to urge the door assembly to the closed position.

6. The air duct outlet of claim 5, further comprising a latch assembly connected to the housing, wherein the latch assembly is configured to releasably secure the door assembly in the open position and to release the door assembly when force is applied to the door such that the door assembly can be urged to the closed position.

7. An air duct outlet, comprising:
    a housing having a passageway extending therethrough;
    a set of louvers movably mounted within the housing passageway that are configured to adjust a direction of air flowing through the housing into a vehicle compartment, wherein the louvers are movable between a retracted position within the housing and an extended position extending outwardly from the housing; and
    a door assembly movably mounted to the housing and movable between a closed position and an open position, wherein the door substantially covers the passageway when the door assembly is in the closed position, wherein the door is retracted from the passageway when the door assembly is in the open position, and wherein the door assembly is operably associated with the set of louvers such that when the door assembly is moved to the open position the set of louvers are moved to the extended position, and such that when the door assembly is moved to the closed position the set of louvers are moved to the retracted position, wherein the door assembly comprises:
        a door having an exterior surface; and
        a pair of side panels connected to the door in adjacent, spaced-apart relationship, wherein each side panel has an arcuate slot formed therein that engages a respective guide pin that is movably associated with the housing, and wherein movement of the guide pins causes movement of the door assembly between the open and closed positions which, in turn, causes movement of the set of louvers between the extended and retracted positions.

8. The air duct outlet of claim 7, wherein the door assembly further comprises a spring attached to the housing that is configured to urge the door assembly to the closed position.

9. The air duct outlet of claim 8, further comprising a latch assembly connected to the housing, wherein the latch assembly is configured to releasably secure the door assembly in the open position and to release the door assembly when a force is applied to the door such that the door assembly can be urged to the closed position.

10. The air duct outlet of claim 9, wherein the latch assembly is reciprocatingly operable between a first position and a second position, wherein the door assembly is in the open position when the latch assembly is in the first position, and wherein the door assembly is in the closed position when the latch assembly is in the second position.

11. The air duct outlet of claim 9, further comprising a sensor that is configured to sense the presence of a person within a predetermined proximity of the air duct outlet, and to cause the latch assembly to release the door assembly if closed.

12. An air duct outlet, comprising:
    a housing having a passageway extending therethrough;
    a set of louvers movably mounted within the housing passageway and movable between a retracted position within the housing and an extended position extending outwardly from the housing, wherein the set of louvers are configured to adjust a direction of air flowing through the housing into a vehicle compartment; and
    a door assembly movably mounted to the housing and movable between a closed position and an open position, wherein the door substantially covers the passageway when the door assembly is in the closed position, and wherein the door is retracted from the passageway when the door assembly is in the open position, wherein the door assembly is operably associated with the set of louvers such that when the door assembly is moved to the open position the set of louvers are moved to the extended position, and such that when the door assembly is moved to the closed position the set of louvers are moved to the retracted position, and wherein the door assembly comprises:
  a door having an exterior surface;
  a pair of side panels connected to the door in adjacent, spaced-apart relationship, wherein each side panel has an arcuate slot formed therein that engages a respective guide pin that is movably associated with the housing, and wherein movement of the guide pins causes movement of the door assembly between the open and closed positions which, in turn, causes movement of the set of louvers between the extended and retracted positions; and
  a spring attached to the housing that is configured to urge the door assembly to the closed position.

13. The air duct outlet of claim 12, further comprising a latch assembly connected to the housing, wherein the latch assembly is configured to releasably secure the door assembly in the open position and to release the door assembly when a force is applied to the door such that the door assembly can be urged to the closed position.

14. The air duct outlet of claim 13, wherein the latch assembly comprises a latch assembly that is reciprocatingly operable between a first position and a second position, wherein the door assembly is in the open position when the latch assembly is in the first position, and wherein the door assembly is in the closed position when the latch assembly is in the second position.

15. The air duct outlet of claim 13, further comprising a sensor that is configured to sense the presence of a person within a predetermined proximity of the air duct outlet, and to cause the latch assembly to release the door assembly if closed.

16. A vehicle, comprising:
  an interior compartment having a panel, wherein an air duct terminates at an opening in the panel; and
  an air duct outlet apparatus disposed within the panel opening, comprising:
    a housing having a passageway extending therethrough;
    a set of louvers movably mounted within the housing passageway that are configured to adjust a direction of air flowing through the housing into a vehicle compartment, wherein the louvers are movable along a direction between a retracted position within the housing and an extended position extending outwardly from the housing; and
    a door assembly movably mounted to the housing and movable between a closed position and an open position, wherein the door substantially covers the passageway when the door assembly is in the closed position, wherein the door is retracted from the passageway when the door assembly is in the open position, and wherein the door assembly is operably associated with the set of louvers such that when the door assembly is moved to the open position the set of louvers are moved to the extended position, and such that when the door assembly is moved to the closed position the set of louvers are moved to the retracted position.

17. The vehicle of claim 16, wherein the door assembly comprises:
  a door having an exterior surface; and
  a pair of side panels connected to the door in adjacent, spaced-apart relationship, wherein each side panel has an arcuate slot formed therein that engages a respective guide pin that is movably associated with the housing, and wherein movement of the guide pins causes movement of the door assembly between the open and closed positions which, in turn, causes movement of the set of louvers between the extended and retracted positions.

18. The vehicle of claim 16, wherein the door assembly further comprises a spring attached to the housing that is configured to urge the door assembly to the closed position.

19. The vehicle of claim 18, further comprising a latch assembly connected to the housing, wherein the latch assembly is configured to releasably secure the door assembly in the open position and to release the door assembly when a force is applied to the door such that the door assembly can be urged to the closed position.

20. The vehicle of claim 19, wherein the latch assembly comprises a latch assembly that is reciprocatingly operable between a first position and a second position, wherein the door assembly is in the open position when the latch assembly is in the first position, and wherein the door assembly is in the closed position when the latch assembly is in the second position.

21. The vehicle of claim 19, further comprising a sensor that is configured to sense the presence of a person within a predetermined proximity of the air duct outlet, and to cause the latch assembly to release the door assembly if closed.

22. The vehicle of claim 17, wherein the door exterior surface has an appearance that is substantially similar to an appearance of an exterior surface of the interior compartment panel.

23. A vehicle, comprising:
  an interior compartment having a panel, wherein an air duct terminates at an opening in the panel; and
  an air duct outlet apparatus disposed within the panel opening, comprising:
    a housing having a passageway extending therethrough;
    a set of louvers movably mounted within the housing passageway and movable between a retracted position within the housing and an extended position extending outwardly from the housing, wherein the set of louvers are configured to adjust a direction of air flowing through the housing into a vehicle compartment; and
    a door assembly movably mounted to the housing and movable between a closed position and an open position, wherein the door substantially covers the passageway and is substantially flush with the interior compartment panel when the door assembly is in the closed position, and wherein the door is retracted from the passageway when the door assembly is in the open position, wherein the door assembly is operably associated with the set of louvers such that when the door assembly is moved to the open position the set of louvers are moved to the extended position, and such that when the door assembly is moved to the closed position the set of louvers are moved to the retracted position, and wherein the door assembly comprises:
- a door having an exterior surface;
- a pair of side panels connected to the door in adjacent, spaced-apart relationship, wherein each side panel has an arcuate slot formed therein that engages a respective guide pin that is movably associated with the housing, and wherein movement of the guide pins causes movement of the door assembly between the open and closed positions which, in turn, causes movement of the set of louvers between the extended and retracted positions; and
- a spring attached to the housing that is configured to urge the door assembly to the closed position.

24. The vehicle of claim 23, further comprising a latch assembly connected to the housing, wherein the latch assembly is configured to releasably secure the door assembly in the open position and to release the door assembly when a force is applied to the door such that the door assembly can be urged to the closed position.

25. The vehicle of claim 24, wherein the latch assembly comprises a latch assembly that is reciprocatingly operable between a first position and a second position, wherein the door assembly is in the open position when the latch assembly is in the first position, and wherein the door assembly is in the closed position when the latch assembly is in the second position.

26. The vehicle of claim 24, further comprising a sensor that is configured to sense the presence of a person within a predetermined proximity of the air duct outlet, and to cause the latch assembly to release the door assembly if closed.

27. The vehicle of claim 23, wherein the door exterior surface has an appearance that is substantially similar to an appearance of an exterior surface of the interior compartment panel.

28. An air duct outlet, comprising:
- a housing comprising a front wall having an opening therein that allows air to pass therethrough;
- a door assembly movably mounted to the housing, wherein the door assembly comprises a door having an exterior surface, wherein the door assembly is movable between a closed position and an open position, wherein the door substantially covers the front wall opening and is substantially flush with the front wall when the door assembly is in the closed position, and wherein the door is retracted from the front wall opening when the door assembly is in the open position such that air can pass through the front wall opening; and
- a sensor attached to the front wall that is configured to sense the presence of a person within a predetermined proximity of the air duct outlet, and to cause the latch assembly to release the door assembly if closed.

* * * * *